Patented May 13, 1952

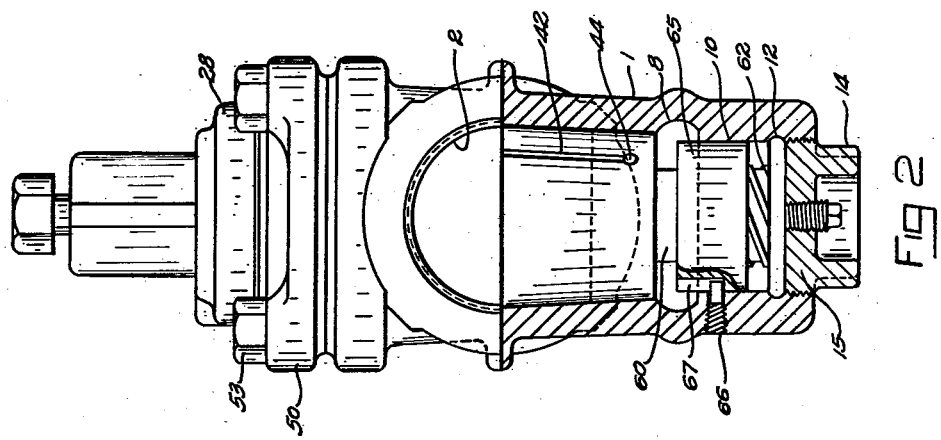
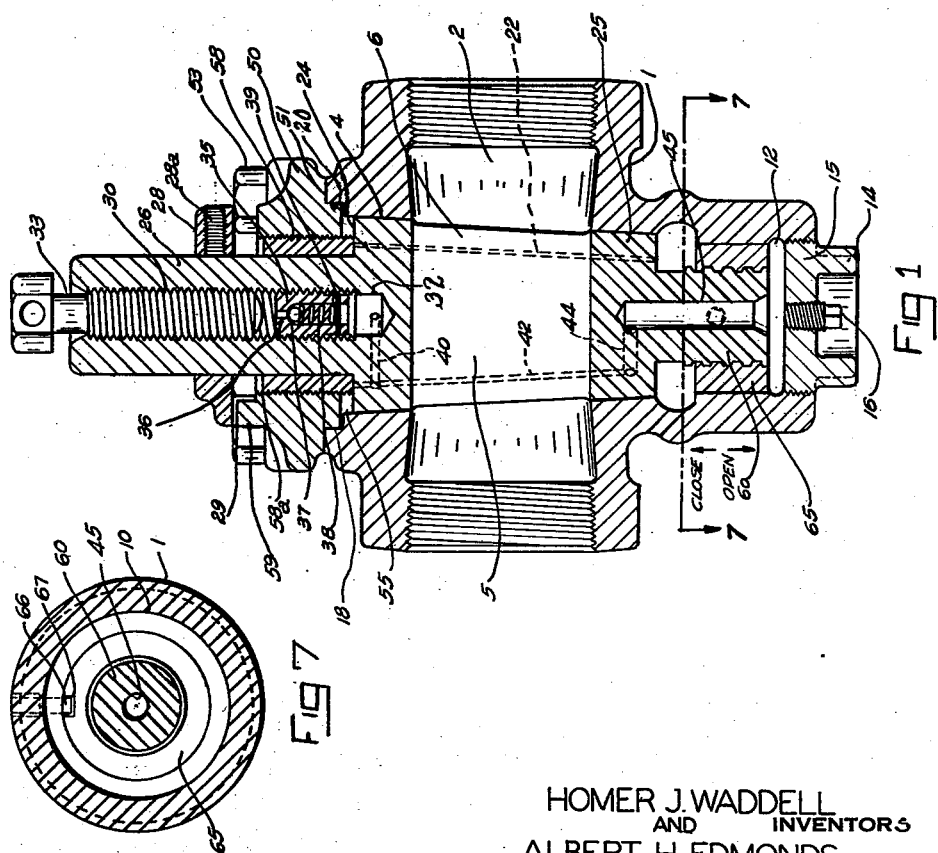

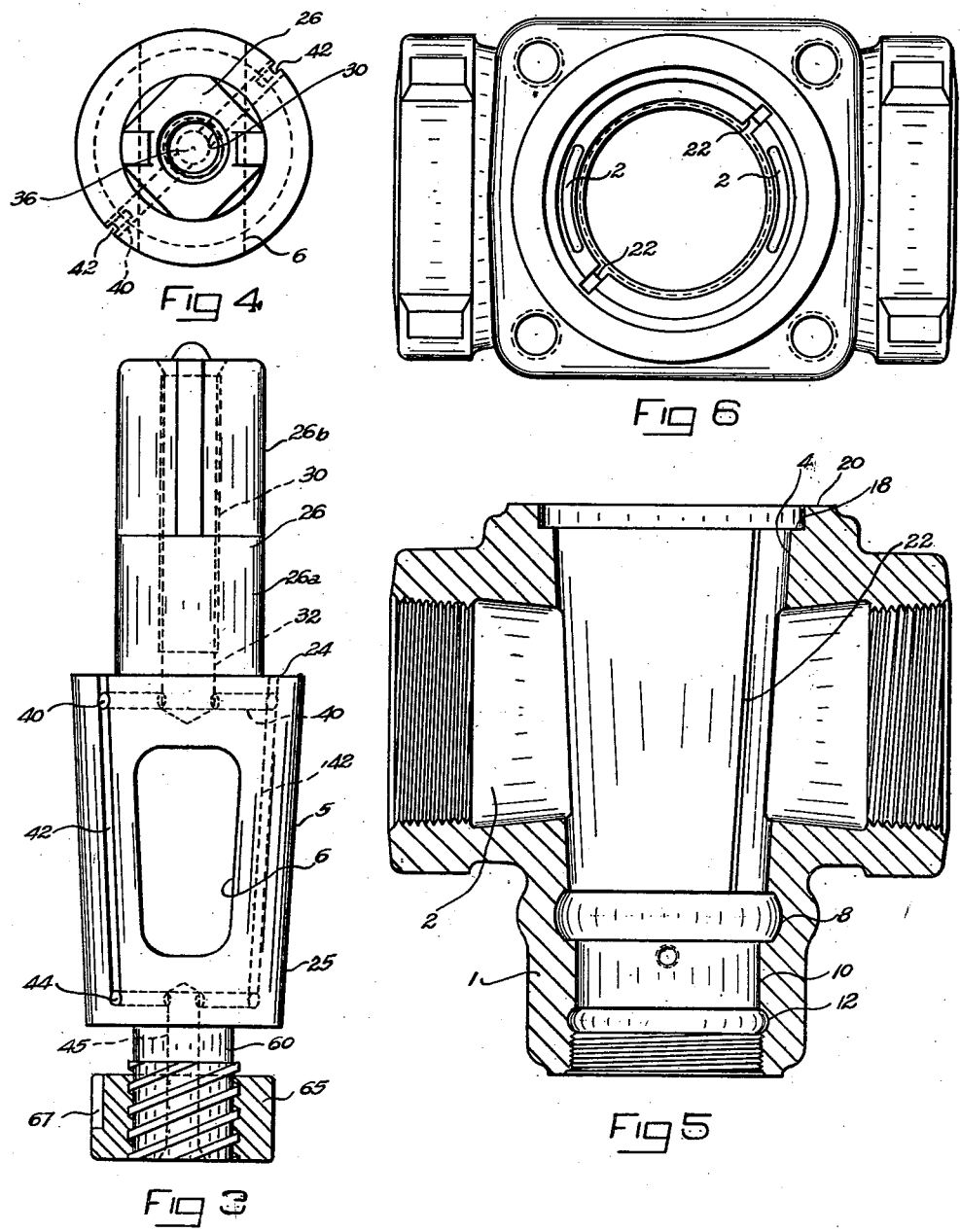

2,596,964

UNITED STATES PATENT OFFICE 2,596,964

LUBRICATED PLUG VALVE

Homer J. Waddell, Baltimore, and Albert H. Edmonds, Lancaster, Ohio, assignors, by mesne assignments, to The Waddell Manufacturing Company, Inc., a corporation of Ohio Application August 30, 1946, Serial No. 693,898

14 Claims. (Cl. 251—93)

This invention is directed to improvements in lubricated plug valves in which the valve surfaces are lubricated with each operation of the valve, the rotation of the valve forcing the lubricant over the valve seating surfaces. While in some respects the improved valves shown and described herein are similar to the valve shown in the prior patent to the applicant Homer J. Waddell, No. 2,244,928, dated June 10, 1941, the applicants here have improved upon the basic design of said prior patent in many important particulars.

One of the principal objects of the invention is to adapt the design of the earlier patent to a lubricating system by which the lubricant is circulated over the contacting surfaces of the plug and valve body and across the top of the plug to and from a main lubricant reservoir which is conveniently located in the base of the valve housing. This action effects a superior lubrication of the valve and conserves the lubricant.

It is a further object of the invention to provide for a complete lubricant sealing of the flow passage through the valve.

Further objects of the invention are to improve upon the method of holding the plug on its seat, to simplify the construction of the valve and to provide a rugged structure which will operate effectively under the varied uses to which a valve of this type is subjected in service.

The valve structure is illustrated in its best known and preferred form, and while shown and described in detail, it will be understood that many of the details are not essential to a realization of the advantages of the invention and such details may be altered or modified within the scope of the invention as set forth in the appended claims.

In the drawings in which a practical and commercial form of the invention is shown:

Fig. 1 is a vertical longitudinal section through a complete valve assembly shown in open position;

Fig. 2 is a part side elevation and part section taken at right angles to Fig. 1, but showing the valve in closed position;

Fig. 3 is a side elevation and Fig. 4 a plan view of the plug removed from the valve body;

Fig. 5 is a vertical section and Fig. 6 a plan view of the body or housing; and

Fig. 7 is a section on the line 7—7 of Fig. 1.

The valve is characterized by the provision of a plunger or piston in screw-threaded relation to the rotatable plug and so designed that with each operation of the plug, the piston makes a full stroke, either up or down, in a receptacle or reservoir filled with the lubricant. The movement of the piston forces the lubricant from the reservoir and returns it to the reservoir in a circuit which includes the seating surfaces of the plug and valve body and the top of the plug. By circulating the lubricant in the manner stated, the seating surfaces of the valve are thoroughly lubricated and yet little of the lubricant is forced out into the flow passages. While it has been attempted to devise a circulatory system for lubricating plug valves, none of the earlier devices has been completely satisfactory. In the drawings the plug and the seat on the valve body are shown as conical, and while this is preferred, the invention may be applied to a cylindrical plug and valve seat. Where the terms "upper" and "lower" are employed, these terms are relative merely as the valve may be located in any position.

The valve body or housing 1 is of any usual or typical form, that shown herein having oppositely positioned ports 2 which provide the flow passage through the body. The valve seat 4 is finished so as to provide the seating surface for the rotatable plug, indicated at 5. The main body or central portion of the plug is provided with the through passage 6 which is brought into and out of register with the ports 2 by a 90° rotation of the plug.

At the base of the seat 4 the valve body is enlarged, as at 8, and provided with a vertical bore 10 of somewhat reduced dimensions and with a lower enlargement 12, this section of the body constituting what may be termed the main lubricant chamber. Below the chamber the housing is threaded to receive a cap 15 provided with a non-circular extension 14 by which the cap may be removed for filling or cleaning the interior of the chamber. A small screw-threaded plug 16 is located in the cap and may be used for the escape of foreign matter which tends to collect at the bottom of the chamber. At the top of the body is the ledge or recess 18 to receive the bonnet, and the upper surface of the body is finished, as at 20, so as to provide a metal-to-metal seal with the bonnet around the open end of the valve body.

In the conical valve seating surface on the body are formed two open channels or grooves 22 which form passages on the surface 4 for the lubricant. As shown in Figs. 5 and 6, these passages are located at diametrically opposite points and extend from the main lubricating chamber to the recess 18. Each passage 22 is located adjacent to and at one side of a port 2 so that in conjunction with other passages on the plug, to be described, a complete lubricant seal is provided surrounding both ports 2 whereby fluid passing through the valve is effectively blocked from seepage along the valve seating surfaces.

The plug 5 is provided with a main or body portion, indicated at 25, which fits the valve seat 2. The upper portion of the plug body is provided with a flat, annular shoulder 24 and from the top of the plug extends the stem 26, the lower portion 26$^a$ of which is cylindrical and the upper portion 26$^b$ of which is square or otherwise shaped to provide for the application of a wrench for turning the plug. This portion of the stem also affords a seat for a stop ring 28 which is provided with a downwardly turned lug 29 and held in position by a set screw 28$^a$. In accordance with the usual practice, this lug rotates between two stops formed on the bonnet to limit the rotation of the plug to 90° from the fully opened to the fully closed position.

The stem is provided with a long, axial screw-threaded passage 30 which extends from the top of the stem to a point below the shoulder 24 and within the main body of the plug where there is located a small chamber 32. The passage 30 receives the lubricant feed screw 33 by which lubricant, usually in the form of a plastic grease stick, is fed into the system to replenish any lubricant which may be lost through the flow passage. At the base of the passage 30 is a plug 35 which is provided with a port 36 against which a spring-held ball check valve 37 is positioned to prevent return of lubricant back into the passage 30. Below the check valve is the spring 38 held in position by a transverse pin 39.

From the chamber 32, two diametrically opposed radial passages 40 lead to the seating surface of the plug where they discharge lubricant to two vertical grooves or channels 42 which extend from the top of the plug at the shoulder 24 to points near the bottom of the main body where they are in communication with two radial passages 44 which connect with an axial passage 45 which extends from this point to the bottom of the plug where it opens into the lower portion of the main lubricant chamber.

As shown in Figs. 3 and 4, each passage 42 lies along and adjacent to one side of the through passage 6 and is so arranged that during the 90° travel from fully opened to fully closed position, the channel 42 wipes over the solid wall of the surface 4 and, therefore, never is in register with a port 2, so that the lubricant in the groove will not be exposed to the direct action of the fluid passing through the valve which would tend to wash the lubricant out of the groove. It will also be noted that each port 2 in the valve body is always located between a lubricant groove 22 on the body and a lubricant groove 42 on the plug. This, in conjunction with the lubricant seals at the top and bottom of the plug body, makes a complete lubricant seal surrounding each port.

The bonnet is indicated at 50. This member is provided on its under side with a machine finished rabbeted shoulder 51 which seats on the surface 20 and fits closely in the recess 18 on the top of the body. The bonnet is securely clamped to the body by bolts 53. It will be noted that the shoulder 24 on the plug lies somewhat below the bonnet so that an annular chamber 55 is provided over the top of the plug and about the line where the plug and the body meet. This space constitutes a secondary lubricant reservoir which is filled by grease flowing into it from the channels 22 and 42.

The lubricant seal about the ports 2 is, therefore, formed by the channels 22 and 42 and by the lower lubricant chamber 8 and the upper or secondary lubricant chamber 55.

The inner surface of the bonnet is spaced from the portion 26$^a$ of the stem and is threaded to receive a sleeve 58, the inner surface of which is in close rotative fit with the stem. The upper rim of the sleeve 58 is formed with notches 58$^a$ for engagement by a spanner and the lower rim is machine finished to bear against the shoulder 24. When the valve is assembled, the sleeve 58 is turned down on the bonnet until the plug is forced into the required close-fitting contact with the seat 4, and then the upper edge of the sleeve may be peened so that the sleeve will not turn with the plug and the plug will be held in its seat with the desired pressure.

The upper surface of the bonnet is provided with two lugs 59, one of which is shown in Fig. 1, which cooperate with the lug 29 to limit the plug to 90° rotational movement.

The lower end of the plug is formed with an axial extension 60 which extends into the main lubricant reservoir. This extension is considerably smaller than the inner diameter of the bore 10 of the main lubricant reservoir. The extension is cut with a relatively steep thread 62 over most of its length. This is preferably a multiple thread and its pitch is dependent upon the distance over which the piston 65 is to move in a quarter turn of the plug. The thread is steep enough to impart a substantial travel to the piston during the short arcuate movement required to open or close the valve.

The piston 65, which is threaded on the extension 60, has a close sliding fit with the wall 10 and is prevented from turning by a threaded pin 66 set in the wall of the housing and entering a vertical slot 67 in the piston.

Assuming that the lubricant chambers and passages are filled and that the valve is in open position as shown in Fig. 1, rotation of the valve to closed position raises the piston 65. During this movement lubricant trapped in the section 8 will be forced upwardly along the channels 22 and into the secondary lubricant chamber 55 whence it will flow through the grooves 42 and passages 44—45 into the lower section 12 of the main lubricant chamber. On opening the valve, the downward movement of the piston sends grease in the reverse direction from section 12 up the passage 45, through passages 44 and grooves 42 into the chamber 55 whence it returns to the section 8 along the grooves 22.

It will thus be seen that with each operation of the valve, a charge of lubricant is forced to circulate over the valve seating surfaces to which it is carried by the rotation of the plug and the entire seating surface will be thoroughly lubricated. At the same time the top of the plug will also be lubricated and some of the grease will find its way between the under surface of the sleeve 58 and the shoulder 24. This circulatory movement of the lubricant not only gives a more thorough and effective lubrication of all of the surfaces of the valve which are in rotative contact, but also serves to scavenge any particles of foreign matter which may collect in the valve and eventually deliver them to the main lubricant reservoir where they may be removed by bleeding the system by removing the plug 16.

The amount of lubricant which will circulate through the channels 22 and 42 is dependent upon the pitch of the thread 62, and this may be regulated so as to obtain more or less circulation during the major portion of the turning movement. During the opening movement when it is most essential that grease be forced into the valve seating surfaces to assist in the initial turning movement of the valve, the grease is forcibly moved through the grooves and over the seating surfaces. Likewise during the closing movement, the piston imparts a positive pressure to the grease.

The advantages of the invention will be readily understood by those familiar with the use of lubricated plug valves, and it will be seen that the principles of the invention may be embodied in variations and modifications of the design here shown.

What is claimed is:

1. A lubricated plug valve comprising the combination of a valve body having a through passage therein, a valve seat in the body extending to either side of the passage, a valve plug rotatable in opposite directions in the seat to open and close the valve, said plug having a solid one-piece portion with a second through passage therein adapted to be moved into and out of register with the through passage in the valve body, a system of lubricating channels in the contacting surfaces of the valve plug and the valve seat, a lubricant reservoir in the valve body at one side of the through passages, said channels constituting a closed circuit which includes the reservoir and extends to the other side of the through passages, and means in the reservoir operative as the valve plug is turned in one direction to circulate lubricant from the reservoir through the circuit and return it to the reservoir and, when the valve is turned in the opposite direction, to circulate the lubricant from the reservoir through the circuit and return it to the reservoir in the reverse direction.

2. A lubricated plug valve comprisng the combination of a valve body having a through passage therein, a valve seat in the body extending to either side of the passage, a valve plug rotatable in opposite directions in the seat to open and close the valve, said plug having a solid one-piece portion with a second through passage therein adapted to be moved into and out of register with the through passage in the valve body, a system of lubricating channels in the contacting surfaces of the valve plug and the valve seat, a lubricant reservoir in the valve body at one side of the through passages, said channels constituting a closed circuit which includes the reservoir and extends to the other side of the through passages, and lubricant forcing means having driving connection with the plug operative as the valve plug is turned in either direction to circulate lubricant from the reservoir through the circuit and return it to the reservoir.

3. A lubricated plug valve comprising the combination of a valve body having a through passage therein, a valve seat in the body extending to either side of the passage, a valve plug rotatable in opposite directions in the seat to open and close the valve, said plug having a solid one-piece portion with a second through passage therein adapted to be moved into and out of register with the through passage in the valve body, a system of lubricating channels in the contacting surfaces of the valve plug and the valve seat, a lubricant reservoir in the valve body at one side of the through passages, said channels constituting a closed circuit which includes the reservoir and extends to the other side of the through passages, and lubricant forcing means having driving connection with the plug operative as the valve plug is turned in one direction to operate the lubricant forcing means to circulate lubricant from the reservoir through the circuit and return it to the reservoir and, when the valve is turned in the other direction, to circulate the lubricant from the reservoir through the circuit and return it to the reservoir in the reverse direction.

4. A lubricated plug valve comprising the combination of a valve body having a through passage therein, a valve seat in the body extending to either side of the passage, a valve plug rotatable in opposite directions in the seat to open and close the valve, said plug having a solid one-piece portion with a second through passage therein adapted to be moved into and out of register with the through passage in the valve body, a system of lubricating channels in the contacting surfaces of the valve plug and the valve seat, a lubricant reservoir in the valve body at one side of the through passages, said channels constituting a closed circuit which includes the reservoir and extends to the other side of the through passages, and means to circulate lubricant in reverse directions through the system, said last named means comprising a piston in the reservoir having driving connection with the valve plug to move it in one direction as the plug is rotated to close the through passage in the valve body and to move it in the opposite direction as the valve plug is moved to open the through passage in the valve body, said piston having a close fit with the wall of the reservoir.

5. A lubricated plug valve comprising the combination of a valve body having a through passage therein, a valve seat in the body extending to either side of the passage, a valve plug rotatable in opposite directions in the seat to open and close the valve, said plug having a solid one-piece portion with a second through passage therein adapted to be moved into and out of register with the through passage in the valve body, a system of lubricating channels in the contacting surfaces of the valve plug and the valve seat, a lubricant reservoir in the valve body at one side of the through passages, said channels constituting a closed circuit which includes the reservoir and extends to the other side of the through passages, and means to circulate lubricant in reverse directions through the system, said last named means comprising a threaded stem on the valve plug and located in the reservoir, and a piston threaded onto the stem and having a close fit with the wall of the reservoir.

6. A lubricated plug valve comprising the combination of a valve body, a valve seat in the body, a valve plug rotatable in opposite directions in the seat, said valve plug having a solid one-piece central portion having a passage therein and operative as the plug is rotated to open and close the valve, lubricating channels in the contacting surfaces of the valve plug and the valve seat and a lubricant reservoir in the body in communication with the lubricating channels to form with the channels a closed circuit, a threaded stem on the valve plug and located in the reservoir, a passage through the stem and constituting a part of the said system, and a piston on the threaded stem having a close fit with the wall of the reservoir.

7. A lubricated plug valve comprising the combination of a valve body, a valve seat in the body, a one-piece valve plug rotatable in opposite directions in the seat to open or close the valve, a pair of lubricating channels in the valve seat and a pair of lubricating channels on the surface of the valve plug, a lubricant reservoir in the valve body, a threaded stem on the valve plug located in the reservoir, a piston threaded on said stem and having a close fit with the wall of the reservoir, one set of lubricating channels being in communication with the reservoir at one side of the piston, the other set of lubricating channels being in communication with the reservoir on the other side of the piston, and means remote from the reservoir connecting the channels to form a closed circuit through which the lubricant circulates in opposite directions to and from the reservoir when the plug is rotated to open or to close the valve, respectively.

8. A lubricated plug valve comprising the combination of a valve body, a valve seat formed in the body, a solid, one-piece valve plug rotatable in opposite directions in the seat to open and close the valve, a lubricant reservoir in the body, lubricating channels in the contacting surfaces of the valve plug and valve seat constituting a closed circuit, said channels being in communication at a point remote from the reservoir and having ports communicating at spaced points with the reservoir, and means to circulate lubricant through the channels and to and from the reservoir in reverse directions as the valve is opened or closed, said means comprising a piston movable in the reservoir between the spaced points, and a driving connection between the plug and the piston to actuate the piston in opposite directions as the valve is opened or closed.

9. A lubricated plug valve comprising the combination of a valve body, a valve seat formed in the body, a solid one-piece valve plug rotatable in opposite directions in the seat to open and close the valve, a lubricant reservoir in the body, lubricating channels in the contacting surfaces of the valve plug and valve seat and a lubricant passage remote from the reservoir, said channels and passage constituting a closed circuit which communicates at spaced points with the reservoir, and means to circulate lubricant through the channels and to and from the reservoir in reverse directions as the valve is opened or closed, said means comprising a piston movable in the reservoir between the spaced points, and a threaded extension on the valve plug engaging the piston.

10. A lubricated plug valve comprising the combination of a valve body, a valve seat formed in the body, a one-piece valve plug rotatable in opposite directions in the seat to open and close the valve, a lubricant reservoir in the body, ports in the body and a passage through the plug movable into and out of register with the ports, lubricating channels in the contacting surfaces of the valve plug and valve seat, said channels constituting a closed circuit which surrounds the ports at all times and communicates with the reservoir at spaced points, and a lubricant forcing device movable in the reservoir between the spaced points and operative to force the lubricant out of one side of the reservoir through the channels and return the lubricant to the other side of the reservoir in reverse directions as the valve plug is rotated to open or close the valve.

11. A lubricated plug valve comprising the combination of a valve body, a valve seat formed in the body, a one-piece valve plug rotatable in opposite directions in the seat to open and close the valve, a lubricant reservoir in the body, ports in the body and a passage through the plug movable into and out of register with the ports, lubricating channels in the contacting surfaces of the valve plug and valve seat, said channels constituting a closed circuit which surrounds the ports at all times and communicates with the reservoir at spaced points, a threaded extension on the valve plug and a piston on said extension and movable thereby between the spaced points to force the lubricant out of one side of the reservoir through the channels and return the lubricant to the other side of the reservoir in reverse directions as the valve plug is rotated to open or close the valve.

12. A lubricated valve comprising a valve body, a seat in the valve body, a rotatable plug in the seat, opposite ports in the valve body and a passage through the plug movble into and out of register with the ports, a lubricant reservoir in the valve body at the lower end of the seat, spaced lubricant channels extending from the top of the reservoir along the seat, spaced lubricant channels on the surface of the plug, a lubricant passage establishing communication between the channels in the valve body and the channels in the plug at a point remote from the reservoir, said lubricant channels on the plug communicating with the lower part of the reservoir, said channels and lubricant passage constituting a closed lubricant circulating system, and a piston in the reservoir movable in opposite directions as the plug is rotated to open and close the valve.

13. A lubricated plug valve comprising a valve body, a valve seat in the body and a rotatable plug in the seat, a closed lubricating circuit of constant capacity including channels in the contacting surface of the plug and the body, and a lubricating reservoir in the body, a piston in the reservoir movable between the entrances to the respective channels, said piston and plug being connected to reciprocate the piston on the opening and closing movements of the valve and force the lubricant to and from the reservoir through the system in reverse directions.

14. A lubricated plug valve comprising a valve body, a valve seat in the body and a rotatable plug in the seat, a closed lubricating circuit of constant capacity including channels in the contacting surface of the plug and the body, and a lubricant reservoir in the body, a piston in the reservoir movable between the entrances to the respective channels, said piston and plug being connected to reciprocate the piston on the opening and closing movements of the valve and force the lubricant to and from the reservoir through the system in reverse directions, and ports in the valve body, said lubricating circuit surrounding said ports at all times.

HOMER J. WADDELL.
ALBERT H. EDMONDS.

REFERENCES CITED

The following references are of record in the file of this patent:

UNITED STATES PATENTS

| Number | Name | Date |
| --- | --- | --- |
| 1,910,947 | Coffman | May 23, 1933 |
| 2,066,250 | Clark | Dec. 29, 1936 |
| 2,169,525 | Goldberg | Aug. 15, 1939 |
| 2,244,928 | Waddell | June 10, 1941 |
| 2,331,362 | Waddell | Oct. 12, 1943 |